No. 878,582. PATENTED FEB. 11, 1908.
J. WEBER, Jr.
MECHANICAL MOTOR VEHICLE PROPULSION.
APPLICATION FILED MAY 12, 1906.
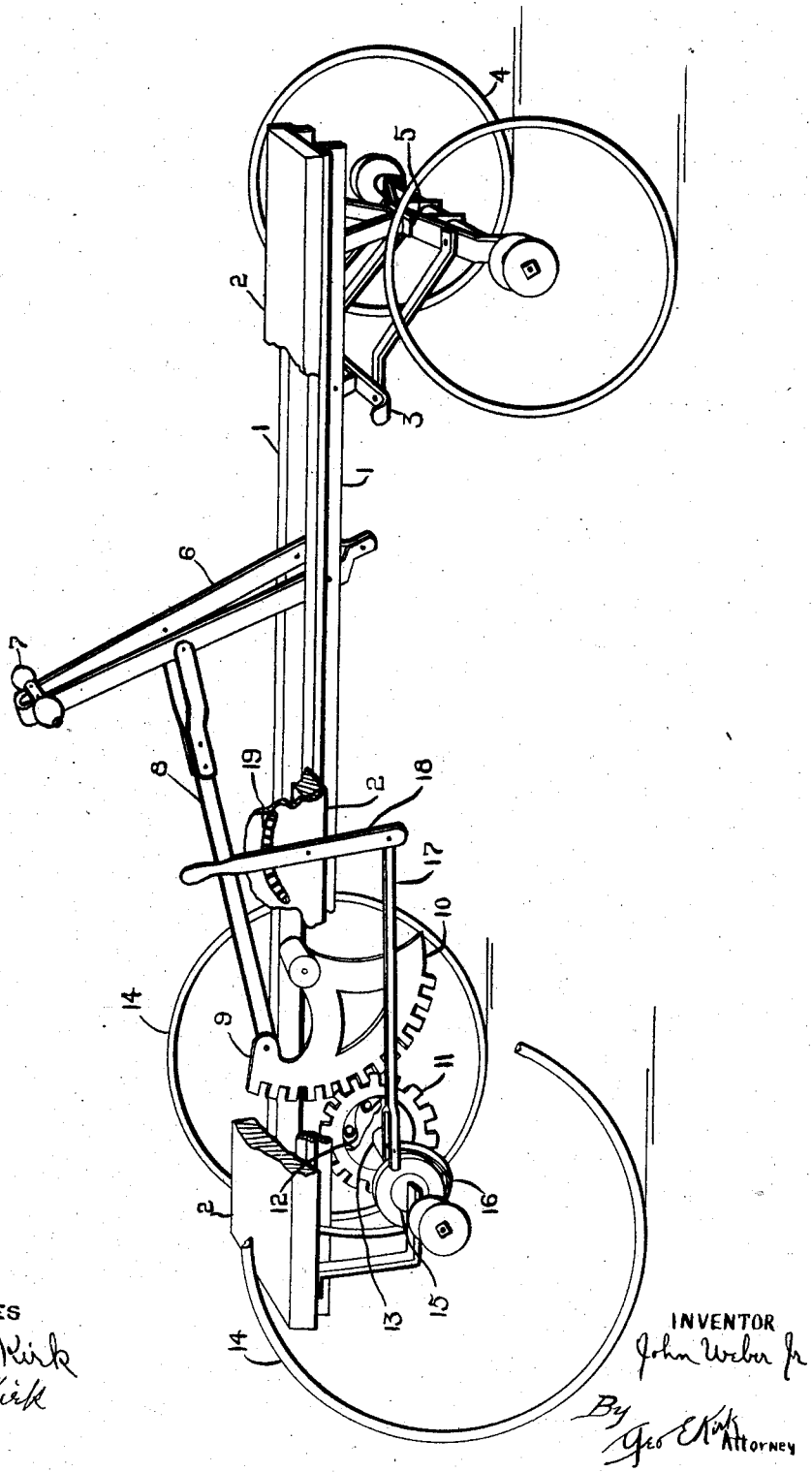
WITNESSES
INVENTOR

UNITED STATES PATENT OFFICE.

JOHN WEBER, JR., OF TOLEDO, OHIO, ASSIGNOR TO THE TOLEDO METAL WHEEL COMPANY, OF TOLEDO, OHIO, A CORPORATION OF OHIO.

MECHANICAL MOTOR-VEHICLE PROPULSION.

No. 878,582.  Specification of Letters Patent.  Patented Feb. 11, 1908.

Application filed May 12, 1906. Serial No. 316,449.

*To all whom it may concern:*

Be it known that I, JOHN WEBER, Jr., a citizen of the United States, residing at Toledo, in the county of Lucas and State of Ohio, have invented certain new and useful Improvements in Mechanical Motor-Vehicle Propulsion, of which the following is a specification.

This invention relates to a power transmission device having certain freeing means, together with provisions for controlling the driven element.

This invention has utility when adapted to vehicle propulsion, especially the mechanical motor driven type.

The drawing is a perspective view with parts broken away showing an embodiment of the invention in a mechanical motor propelled vehicle.

The chassis has longitudinally extending angle bars 1 on which is mounted the vehicle body 2, the greater portion of which is broken away to better show the moving parts.

The direction of travel of the vehicle may be controlled by the feet of the operator placed upon the pivoted bar 3, which bar 3 is connected to turn the front wheels 4 on their swivel or fifth wheel mounting 5.

Pivotally mounted intermediate the angle bars 1 is the driving element 6 having the handle bar 7 near its free end. Between the handle bar 7 and the pivotal mounting there is connected to the element 6, the link 8 having its opposite end attached to the segment 9, which segment 9 has near one extremity an untoothed portion 10. The segment 9 is pivotally mounted between the bars 1, and its teeth mesh with those of the wheel 11. In driving the vehicle forward, the one way roller clutch 12 locks the wheel 11 to the driven element, shaft or rear axle 13 on which one of the wheels 14 is fast and the other loose. Also mounted on the driven element 13 is the brake wheel 15 against the periphery of which the brake strap 16 may be forced by the link 17 through the medium of the hand lever 18 pivotally mounted on the vehicle body 2. The hand lever 18 engages the curved rack 19 on the body 2, permitting locking of the brake strap in or out of engagement with the brake wheel.

Operation: Oscillation of the element 6 serves on its backward pull stroke, through the one-direction disconnecting means or clutch 12, to drive the element 13 in one direction to propel the vehicle forward. The recover or forward stroke of the element 6 is independent of the speed of the driven element 13, thereby permitting of a rapid idle stroke, so important in rowing, to which the movements here are analogous.

The element 6 cannot come into a position of locking. There are no dead centers off of which the vehicle must be pushed. The stroke element 6 is always freely movable from the beginning, or any intermediate position, toward the end of its working stroke. In other words this is a variable stroke driving mechanism permitting the operator to use such stroke length, either constant or variable, in such portion of the maximum stroke limits of the driving element as best suit his wishes. This permits of quickly getting under high speed with a minimum of effort.

The clutch 12 is an automatic one-direction disconnecting means between the stroke element 6 and the driven element 13. There is another one-direction disconnecting means 10. Backward movement of the vehicle, or coasting rearwardly, throws the element 6 forward to the limit of its stroke where the untoothed portion 10 of the segment 9 is opposed to the teeth of the wheel 11. In this position there is no driving connection between the elements 6 and 13. From the above-described operation, it will appear that this second one-direction disconnecting means 10 is automatic in its action. The oscillating driving segment 9 is accordingly movable to a free position relative to the wheel 11. The wheel 11 while automatically connected up on one side, is automatically disconnected or freed on the other.

The two one-direction automatic disconnecting means permit of forward or backward movement of the vehicle independently of the driving mechanism. Within the limits of movement the stroke element 6 can be used to lock the vehicle against backward movement. However, it is desirable to have means to control the travel of the vehicle not only backward independently of the stroke element, but forward, in which latter direction there is no control by the driving element to prevent excessive speeds. Convenient and effective means for controlling the driven element 13 is available through the hand lever 18 connected to the strap brake 15, 16.

The idea of the invention herein disclosed is not to be limited by the drawing and description to any greater extent than the ordinary meaning of the terms of the claims demand. In other words, the elements set forth in the claims are to be interpreted broadly, giving me the advantage of equivalents in the protection of my idea.

What is claimed and it is desired to secure by Letters Patent is:

1. A traction wheel, a driving element having a one-way clutch connection therewith in a given direction, and a reciprocable device constructed to actuate said element to drive the wheel in the given direction by one movement and to be disengaged from said element when manually or automatically operated to the extremity of its opposite movement.

2. A quadricycle, comprising a traction wheel, a driving pinion having a one-way clutch connection with the wheel in a given direction, and a reciprocable device including a segment constructed to actuate the pinion to drive the wheel in the given direction by one movement and to be disengaged from said element when at the extremity of its opposite movement, and a reciprocable member connected to the segment and controllable directly by the operator in both directions of its movement.

In testimony whereof I affix my signature in the presence of two witnesses.

JOHN WEBER, Jr.

Witnesses:
 JAY BENSON,
 GEO. E. KIRK.